United States Patent
Derenes et al.

(10) Patent No.: US 8,147,184 B2
(45) Date of Patent: Apr. 3, 2012

(54) AIR INTAKE CIRCUIT ARRANGEMENT FOR HIGH PRESSURE COMPRESSOR OF A TURBINE ENGINE

(75) Inventors: Jacky Raphael Michel Derenes, Corbeil-Essonnes (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1084 days.

(21) Appl. No.: 12/032,374

(22) Filed: Feb. 15, 2008

(65) Prior Publication Data

US 2008/0199308 A1 Aug. 21, 2008

(30) Foreign Application Priority Data

Feb. 16, 2007 (FR) ...................... 07 01152

(51) Int. Cl.
*F01B 25/00* (2006.01)
(52) U.S. Cl. ...................................... 415/144
(58) Field of Classification Search .................. 415/144, 415/145, 211.2, 199.5, 149.2; 285/354, 226
See application file for complete search history.

(56) References Cited

U.S. PATENT DOCUMENTS

| 2,720,356 | A | | 10/1955 | Erwin | |
|---|---|---|---|---|---|
| 3,597,106 | A | * | 8/1971 | Anderson | 415/144 |
| 3,846,038 | A | | 11/1974 | Carriere et al. | |
| 4,155,680 | A | * | 5/1979 | Linko et al. | 415/144 |
| 4,155,681 | A | * | 5/1979 | Linko et al. | 415/144 |
| 4,512,715 | A | * | 4/1985 | Cohn et al. | 415/175 |
| 7,845,901 | B2 | * | 12/2010 | Aubin et al. | 415/144 |

FOREIGN PATENT DOCUMENTS

| EP | 1 643 136 A1 | 4/2006 |
|---|---|---|
| EP | 1 688 590 A1 | 8/2006 |

* cited by examiner

*Primary Examiner* — Edward Look
*Assistant Examiner* — Narcrisha Norman
(74) *Attorney, Agent, or Firm* — Oblon, Spivak, McClelland, Maier & Neustadt, L.L.P.

(57) ABSTRACT

In a compressor stage including a movable bladed wheel having movable blades and a fixed bladed wheel having fixed blades, an air tapping circuit arrangement includes a movable wheel manifold designed to collect an air flow aspirated from the movable blades and a fixed wheel manifold designed to collect an air flow aspirated from the fixed blades. The movable wheel manifold is placed on the periphery of the compressor stage facing the movable wheel and the fixed wheel manifold is superposed on the movable wheel manifold.

13 Claims, 3 Drawing Sheets

AIR INTAKE CIRCUIT ARRANGEMENT FOR HIGH PRESSURE COMPRESSOR OF A TURBINE ENGINE

BACKGROUND OF THE INVENTION

The present invention relates to the technical field of compressors for turbojets.

Its subject is an air tapping circuit arrangement of a compressor stage of a turbojet, said compressor stage comprising a fixed bladed wheel having fixed blades and a movable bladed wheel having movable blades, in which said air tapping circuit arrangement comprises a movable wheel manifold designed to collect an air flow aspirated from the movable blades and a fixed wheel manifold designed to collect an air flow aspirated from the fixed blades.

A further subject is a compressor stage, particularly for a turbojet, furnished with such an air tapping circuit arrangement.

A further subject is a compressor for a turbojet, furnished with such an air tapping circuit arrangement and/or such a compressor stage. This compressor may be a high-pressure compressor or a low-pressure compressor.

Finally, its subject is a turbojet fitted with such an air tapping circuit arrangement and/or such a compressor stage and/or such a compressor.

In everything that follows, the terms "axial" and "radial" correspond respectively to an axial direction and a radial direction of the turbojet.

In a known manner, a compressor stage of a turbine engine comprises a movable bladed wheel and a fixed bladed wheel whose respective blades extend between an inner casing and an outer casing which delimit a main stream in which a main air flow travels.

It is well known that aspirating the main flow limit layer in one or more appropriate locations of the profile of the movable and/or fixed blades makes it possible to improve the aerodynamic situation of a compressor stage by improving the compression ratio of this compressor stage without adversely affecting its efficiency or its stall limit. This makes it possible, for a given compression ratio, to reduce the number of compressor stages relative to a compressor whose profiles are not aspirated.

Those skilled in the art know that an aspiration that is carried out only on the movable blades risks creating a considerable diversion of the air flowing in the main stream and that it is therefore preferable to aspirate the air both from the movable blades and the fixed blades.

DESCRIPTION OF THE PRIOR ART

An aspirated compressor is known, for example, from document EP 1 643 136-A1, which describes a certain number of compressor arrangements, in which it is envisaged to aspirate air from the profile of the movable blades of the compressor, and also from the profile of the fixed blades of the compressor.

The air thus aspirated from the compressor is then tapped off in order to be used in another portion of the turbojet, in order to cool hot parts. The air is tapped off through the outer casing by means of manifolds that are placed on the outside of the main stream. Document EP 1 643 136-A1 shows manifolds situated facing the fixed bladed wheels of the compressor stages.

In other words, each stage of the high-pressure compressor is associated with two manifolds placed around the outer casing of the main stream, one of these manifolds collecting the air tapped off from the movable blades, and the other collecting the air tapped off from the fixed blades. Each of these manifolds is also associated with ducts that carry the tapped air to desired locations in the turbojet.

For certain turbojet architectures, the periphery of the high-pressure compressor is also a place that is much in demand for housing accessories and/or equipment of the turbojet. For example, in certain configurations, the fixed blades are fixed in a position that can be adjusted by means of a variable setting system. Typically a variable setting system comprises a pivot associated with each fixed blade on a compressor stage, each pivot being placed by traversing the outer casing, and each pivot being rotated by means of a link arm. All the link arms are connected to a common control mechanism, such as a control ring, whose movement causes all the link arms to tilt in unison. In the presence of such a variable setting system on the outer casing, facing the fixed bladed wheel, it is not always possible to place, in addition, an air tapping manifold.

SUMMARY OF THE INVENTION

The object of the invention is to remedy this disadvantage and propose a suitable architecture that makes it possible to place both operating equipment, such as for example the variable setting systems, and air tapping means such as the manifolds and their associated ducts, while maintaining a reduced space requirement.

According to a first aspect, the invention relates to an air tapping circuit arrangement of a compressor stage of a turbojet, said compressor stage comprising a fixed bladed wheel having fixed blades and a movable bladed wheel having movable blades, wherein said circuit arrangement comprises a movable wheel manifold designed to collect an air flow aspirated from the movable blades and a fixed wheel manifold designed to collect an air flow aspirated from the fixed blades, and wherein said movable wheel manifold is placed on the periphery of said compressor stage facing said movable wheel and said fixed wheel manifold is superposed on said movable wheel manifold.

According to a feature of the invention, said circuit arrangement comprises connecting tubes that each connect the periphery of the compressor stage facing the fixed wheel to the fixed wheel manifold. In addition, said fixed wheel manifold comprises connecting orifices into which said connecting tubes are connected.

According to another feature of the invention, said circuit arrangement comprises at least one adapter part which comprises a first flow path for the air aspirated from the movable blades and a second flow path for the air aspirated from the fixed blades, said first and second flow paths being arranged so as to allow the two air flows to travel with a reduced space requirement of the adapter part. Preferably, said first flow path comprises a first duct section of said adapter part and said second flow path comprises a second duct section of said adapter part.

According to the invention, said first duct section and second duct section have respective directions that cross. In particular, said first duct section and second duct section have directions that cross in a substantially perpendicular manner. For example, said first duct section has a direction parallel to that of the movable wheel manifold and said second duct section has a substantially radial direction.

According to a feature of the invention, said first duct section traverses said second duct section.

According to a particular form of the invention, said first duct section, second duct section and third duct section extend in directions that are perpendicular in pairs.

According to an additional feature, said duct section also comprises a third duct section of said adapter part.

According to a feature of the invention, said adapter part also comprises connection means for connecting it to other elements of said circuit arrangement. For example, said connection means comprise a threading of one end of the first duct section. For example, said connection means comprise a plate for fixing one end of the first duct section. For example, said connection means comprise specific dimensions of the ends of the second duct section that allow a forced engagement of each of said ends in the fixed wheel manifold. Also, said connection means comprise the third duct section.

According to a second aspect, the invention relates to a compressor stage, particularly for a high-pressure compressor of a turbojet, which comprises an air tapping circuit arrangement according to the first aspect.

According to a third aspect, the invention relates to a compressor, particularly a compressor for a turbojet, which comprises at least one compressor stage according to the second aspect and/or at least one air tapping circuit arrangement according to the first aspect.

According to a fourth aspect, the invention relates to a turbojet which comprises a compressor according to the third aspect and/or at least one compressor stage according to the second aspect and/or at least one air tapping circuit arrangement according to the first aspect.

BRIEF DESCRIPTION OF THE DRAWINGS

The invention will be better understood on reading the following detailed description of a particular embodiment of the invention, supplied as an indication and which is in no way limiting, and illustrated by means of the appended drawings, in which.

DESCRIPTION OF THE PREFERRED EMBODIMENTS

Figure 1:
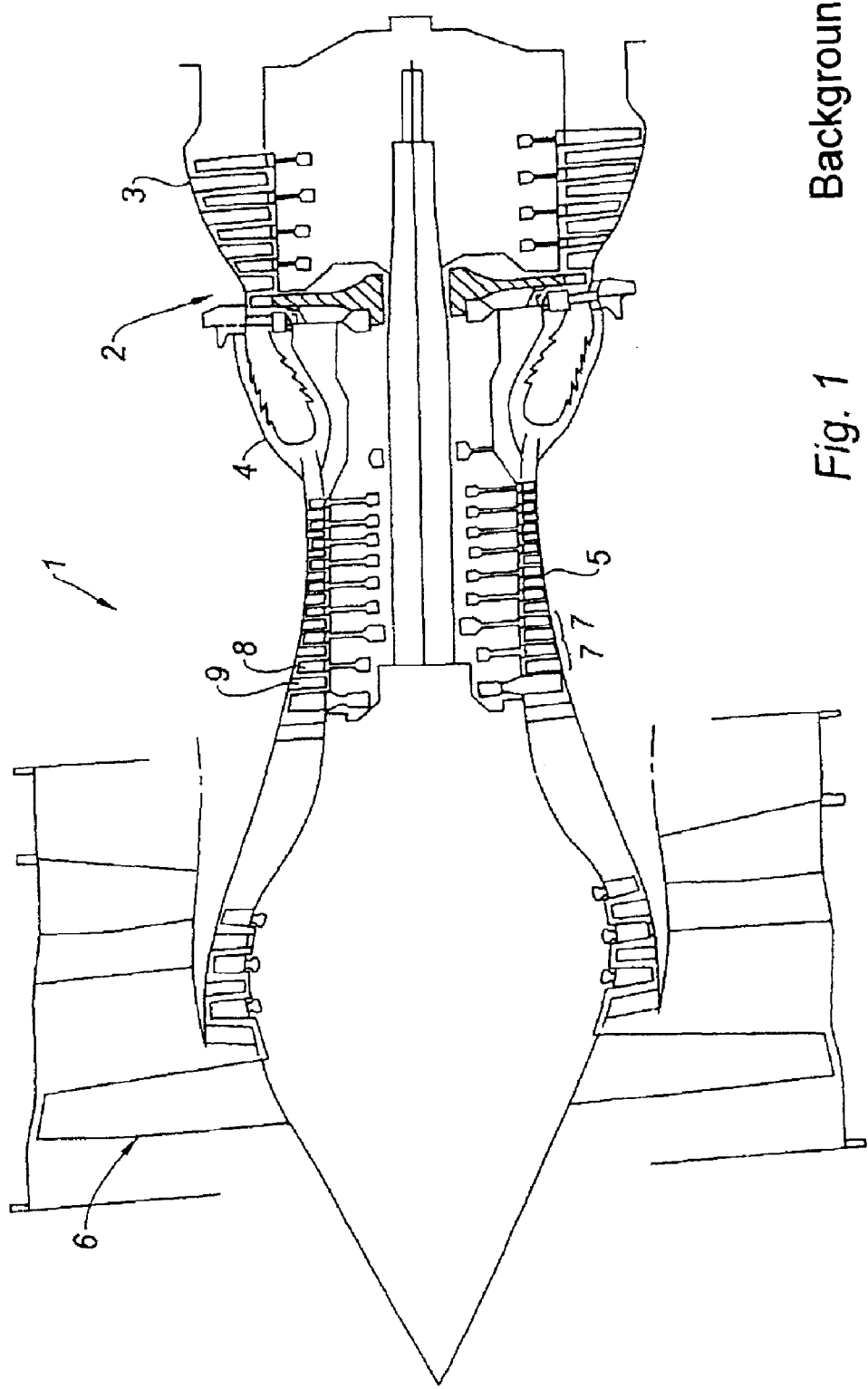
FIG. 1 shows, in axial section, a turbojet comprising a high-pressure compressor furnished with an air tapping circuit arrangement according to the invention.

With reference first of all to FIG. 1, it shows schematically a turbojet 1, comprising a high-pressure turbine 2, a low-pressure turbine 3, a combustion chamber 4, a high-pressure compressor 5, a fan 6. The high-pressure compressor 5 is formed of a certain number of compressor stages 7 each comprising movable blades 8 and fixed blades 9.

Figures 2, 3:
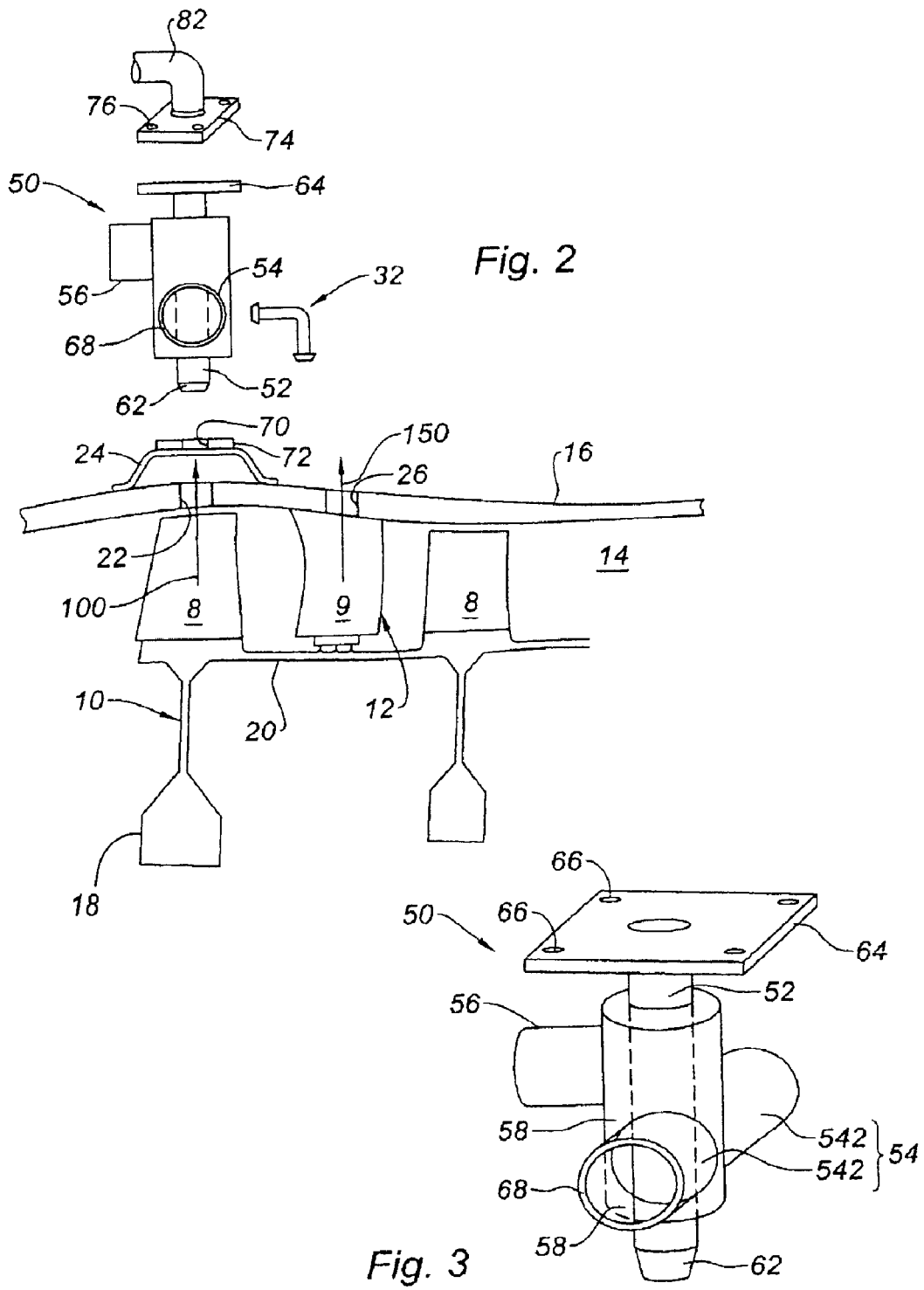
FIG. 2 represents, in axial section and in a schematic manner, a high-pressure compressor stage, and an adapter part for the air tapping circuit arrangement according to the invention.
FIG. 3 represents, in perspective and on a larger scale, an adapter part of the air tapping circuit arrangement according to the invention.

FIG. 2 represents schematically and on a larger scale a compressor stage 7 comprising a movable wheel 10 comprising movable blades 8 and a fixed wheel 12 comprising fixed blades 9. The movable blades 8 and the fixed blades 9 extend in an alternating manner into a main stream 14 delimited by an inner casing (not shown) and by an outer casing 16. The fixed blades 9 are fixed to said outer casing 16 while the movable blades 8 are supported by disks 18 of the movable wheels 10, which disks 18 are connected together by rings 20.

The high-pressure compressor 5 is an aspirated compressor. In other words, air is aspirated from the profile of the movable blades 8 and from the profile of the fixed blades 9 for each compressor stage 7. Accordingly, each movable blade 8 and each fixed blade 9 is traversed by channels that aspirate air from its surface and carry it to one end of said blade 8, 9, said end being the head of the blade for the movable blade 8 and the tip of the blade for the fixed blade 9.

Facing the movable wheel 10, the outer casing 16 is furnished with first tapping orifices 22. On the outer periphery of the compressor 5, and facing the movable wheel 10, the outer casing 16 supports a movable wheel manifold 24 into which said first tapping orifices 22 emerge. The air aspirated from the movable blades 8 is tapped directly into the movable wheel manifold 24 through said first tapping orifices 22, as indicated by the arrow 100.

Facing the fixed wheel 12, the outer casing 16 is furnished with second tapping orifices 26. The air aspirated from the fixed blades 9 is tapped through said second tapping orifices 26, as indicated by the arrow 150, into a fixed wheel manifold 28 that is not shown in FIG. 2.

Figure 4:
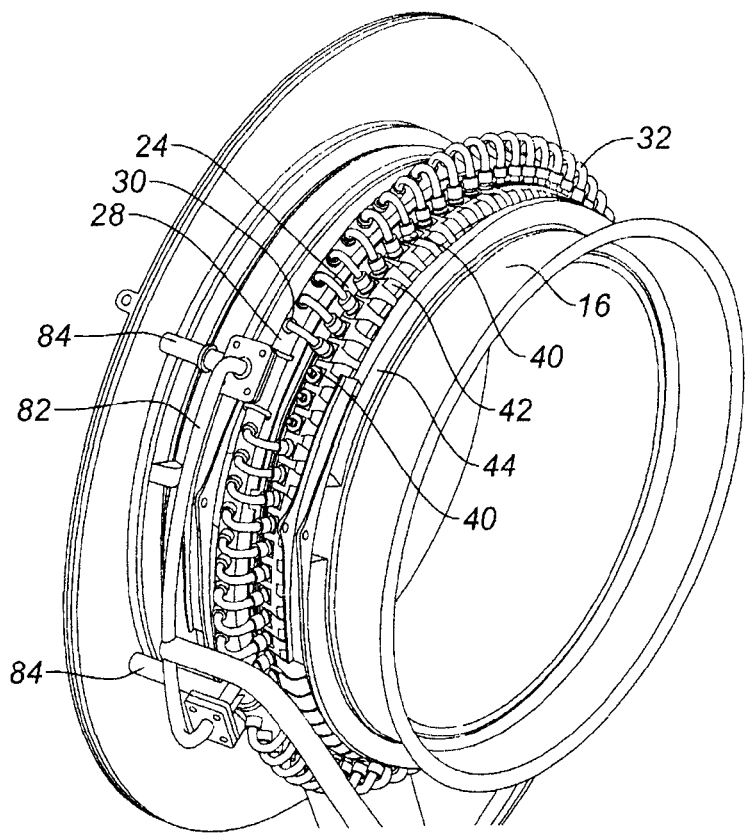
FIG. 4 is a view in perspective of the periphery of the high-pressure compressor showing an air tapping circuit arrangement of a compressor stage.

FIG. 4 illustrates in a more realistic manner and in perspective the outer periphery of the outer casing 16 of a compressor stage 7.

On this outer periphery of the outer casing 16 the variable setting systems associated with each fixed blade 9 appear. Each variable setting system comprises a pivot 40 that is attached to the root of said fixed blade 9 and that is housed in a hole passing through the outer casing 16. The variable setting system associated with said fixed blade 9 also comprises a link arm 42 whereof one end is received on the pivot 40 and the other end is articulated on a common control ring 44. This control ring 44 is placed on the outer periphery of the outer casing 16 close to the pivots 40 associated with the fixed blades 9. This common control ring 44 is capable of rotating on the outer casing 16 between two extreme positions. A rotary movement of this common control ring 44 operates all the link arms 42 which in their turn act on the pivots 40 so as to orient all the fixed blades 9 in the same manner.

The pivots 40 are hollow parts traversed by a duct which places the inside of each fixed blade 9 in communication with the outside of the outer casing 16.

On the periphery of the outer casing 16 and facing the movable wheel 10 the movable wheel manifold 24 appears. The fixed wheel manifold 28 appears superposed on said movable wheel manifold 24, said two manifolds 24, 28 being substantially aligned in a radial direction.

The fixed wheel manifold 28 is furnished with connecting orifices 30 in each of which one end of a connecting tube 32 is housed in a sealed manner. The other end of said connecting tube 32 is connected in a sealed manner to the pivot 40 of the variable setting system of a fixed blade 9. Therefore, the air tapped from the fixed blades 9 is collected in the fixed wheel manifold 28 by means of said connecting tubes 32.

The air tapping circuit arrangement according to the invention comprises the movable wheel manifold 24 and the fixed wheel manifold 28, said manifolds 24, 28 being superposed on one another. Each of said manifolds 24, 28 appears substantially in the shape of an annular tube placed concentrically on the outer casing 16.

Because of the presence of the fixed wheel manifold 28 superposed on the movable wheel manifold 24, it is not easy to connect to the fixed wheel manifold 24 pipes for carrying the tapped air to other portions of the turbojet. The air tapping circuit arrangement comprises one or more adapter part(s) 50 that make(s) it possible to overcome this disadvantage.

Figure 5:
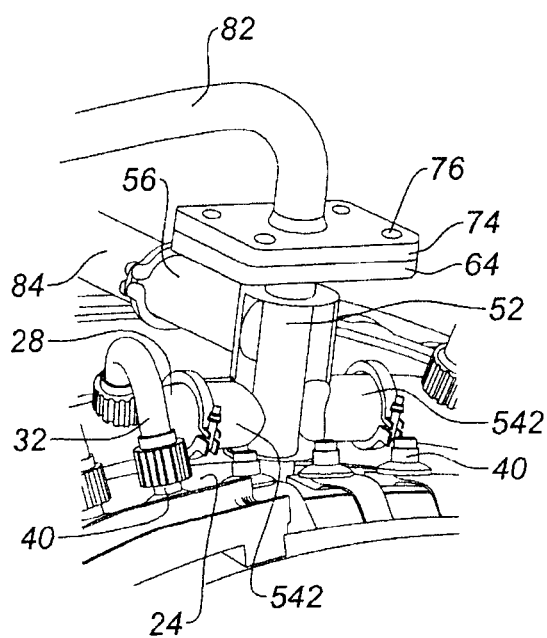
FIG. 5 is another view in perspective, on a larger scale, of a detail of FIG. 4, the adapter part being seen partially cut away.

Such an adapter part 50 is shown separately in a front view in FIG. 2 and in perspective in FIG. 3, and is shown installed in the air tapping circuit arrangement in perspective in FIG. 5. It comprises a first duct section 52, a second duct section 54 and a third duct section 56. Preferably, the first duct section 52 and the second duct section 54 extend in respective directions which cross. In the example illustrated in the figures, said directions cross in a perpendicular manner.

The first duct section 52 forms a first path for the flow of the air tapped from the movable blades 8. The second duct section 54 and the third duct section 56 form a circuit path for the flow of the air tapped from the fixed blades 9. The two flow paths make it possible, inside the adapter part 50, to make the two flows of air tapped respectively from the movable blades 8 and the fixed blades 9 to travel without these two flows mixing, and in such a way that the adapter part 50 has the smallest possible space requirement.

A particular feature of the adapter part 50 is illustrated more particularly in FIGS. 3 and 5. FIG. 5 shows the inside of the adapter part 50, a portion of the latter being cut away. This particularity lies in the fact that the first duct section 52 traverses the second duct section 54. Accordingly, the external diameter of the first duct section 52 is smaller than the internal diameter of the second duct section 54. Therefore, the flow of tapped air in the fixed wheel manifold 28 that travels in the second duct section 54 of the adapter part 50 avoids therein the first duct section 52 which traverses said second duct section 54.

More particularly, as shown in FIG. 3, the adapter part 50 comprises a body 58 that is closed and substantially cylindrical and extending about the first duct section 52. The second duct section 54 is divided into two halves 542, 542 of the second section 54 which connect on either side of said body 58. The third duct section 56 is also connected to said body 58 at the same level as or at another level than the two halves 542, 542 of the second duct section 54.

Said adapter part 50 also comprises connection means 62, 64, 68, 56 for connecting it to the other elements of the air tapping circuit arrangement. More precisely, it comprises:
- first connection means 62, 64 for connecting the first duct section 52 to the movable wheel manifold 24 and to a first conveyor pipe 82 designed to convey the air tapped from the movable blades 8 to other portions of the turbojet 1,
- second connection means 68, 56 for connecting the second duct section 54 to the fixed wheel manifold 28 and to a second conveyor pipe 84 designed to convey the air tapped from the fixed blades 9 to other portions of the turbojet 1.

The first connection means 62, 64 comprise an outer threading 62 of one of the ends of the first duct section 52, capable of interacting with an inner threading 70 of an opening 72 of the movable wheel manifold 24. They also comprise a fixing plate 64 of the other end of the first duct section 52, capable of interacting with a fixing plate 74 of one end of a first conveyor pipe 82. For example, the two fixing plates 64, 74 are fixed to one another via a screwed connection as the holes 66, 76 of the two fixing plates 64, 74 show, respectively in FIG. 2 and FIG. 3.

The second connection means 68, 56 comprise specific dimensions 68 of the two ends of the second duct section 54 for a forced fitting of each of these two ends into a section of the fixed wheel manifold 28. They also comprise the third duct section 56, for connecting the second duct section 54 to the second air conveyor pipe 64. This third duct section 56 is, for example, furnished for this purpose with a threaded nut (not shown).

With an air tapping circuit arrangement according to the invention, the air aspirated from the movable blades 8 is tapped directly into the movable wheel manifold 24 and flows through the first duct section 52 before being discharged to a first conveyor pipe 82 and then to other portions of the turbojet 1. Furthermore, the air aspirated from the fixed blades 9 is tapped into the fixed wheel manifold 28 by means of the connecting tubes 32, and flows through the two halves 544 of the second duct section 54 before being discharged via the third duct section 56 to a second air conveyor pipe 84 and then to other portions of the turbojet 1.

With such an air tapping circuit arrangement, in which the movable wheel manifold 24 and the fixed wheel manifold 28 are superposed, and thanks to the adapter part 50, the two flows of air tapped respectively from the movable blades 8 and the fixed blades 9 may travel with a reduced space requirement and without mixing.

In consequence, the periphery of the outer casing 16 facing the fixed wheel 12 remains available for placing the elements 40, 42, 44 of the variable setting systems of the fixed blades 9.

In a turbojet 1 in which the fixed blades are not furnished with a variable setting system, an air tapping circuit arrangement according to the invention is just as advantageous, because it leaves a free space that may be used for placing an item of equipment other than such a variable setting system, because the outer periphery of the outer casing 16 is in great demand for housing all sorts of equipment or accessories. In such a case, the connecting tubes 32 are connected directly to through-holes of the outer casing 16, each of these through-holes being connected directly to the inside of a fixed blade 9.

Depending on the significance of the need to tap air from the movable blades 8 and the fixed blades 9, the tapping circuit arrangement comprises one or more adapter parts 50 inserted into the fixed wheel manifold 28.

The invention is not limited to the embodiment that has just been described. For example, it is possible to envisage an adapter part 50 whose first duct section 52 and second duct section B54 cross in a nonperpendicular manner.

The invention claimed is:

1. An air tapping circuit arrangement of a compressor stage of a turbojet, said compressor stage comprising a movable bladed wheel having movable blades and a fixed bladed wheel having fixed blades, said circuit arrangement comprising:
   a movable wheel manifold designed to collect an air flow aspirated from the movable blades, said movable wheel manifold being in fluid communication with a first plurality of tapping orifices facing said movable bladed wheel and provided on an outer casing of said compressor stage; and
   a fixed wheel manifold designed to collect an air flow aspirated from the fixed blades, said fixed wheel manifold being in fluid communication with a second plurality of tapping orifices facing said fixed bladed wheel and provided on said outer casing of said compressor stage; and
   an adapter part including a first duct section extending in a substantially radial direction, a second duct section extending in a substantially transverse direction, a third duct section, and a substantially cylindrical body which extends about said first duct section, said first duct section being only in fluid communication with said movable wheel manifold, and said second and third duct sections being only in fluid communication with said fixed wheel manifold, wherein said movable wheel manifold is placed on a periphery of said compressor stage facing said movable wheel and said fixed wheel manifold is superposed on said movable wheel manifold, wherein a first end of said first duct section is connected to said movable wheel manifold and a second end of said first duct section is connected to a first conveyor pipe which conveys air tapped from said movable blades to other portions of said turbojet, wherein said second duct section is divided into two halves which connect on either side of said body, a first end of each of said halves is connected to said body and a second end of each of said halves is connected to said fixed wheel manifold, and wherein a first end of said third duct section is connected to said body so as to be in fluid communication with said second duct section and a second end of said third duct section is connected to a second conveyor pipe which conveys air tapped from said fixed blades to other portions of said turbojet.

2. The circuit arrangement as claimed in claim 1, further comprising connecting tubes that each connect the periphery of the compressor stage facing the fixed wheel to the fixed wheel manifold.

3. The circuit arrangement as claimed in claim 2, wherein said fixed wheel manifold comprises connecting orifices into which said connecting tubes are connected.

4. The circuit arrangement as claimed in claim 1, wherein said first duct section traverses said second duct section.

5. The circuit arrangement as claimed in claim 1, wherein said first duct section, second duct section and third duct section extend in directions that are perpendicular in pairs.

6. The circuit arrangement as claimed in claim 1, wherein said adapter part further comprises connection means for connecting said adapter part to other elements of said circuit arrangement.

7. The circuit arrangement as claimed in claim 6, wherein said connection means comprise a threading of the first end of the first duct section.

8. The circuit arrangement as claimed in claim 6, wherein said connection means comprise a plate for fixing the second end of the first duct section.

9. The circuit arrangement as claimed in claim 6, wherein said connection means comprise specific dimensions of the second end of each of said halves of the second duct section that allow a forced engagement of each of said second end of each of said halves in the fixed wheel manifold.

10. A compressor stage, which comprises an air tapping circuit arrangement as claimed in claim 1.

11. A compressor, which comprises at least one air tapping circuit arrangement as claimed in claim 1.

12. A turbojet, which comprises at least one air tapping circuit arrangement as claimed in claim 1.

13. The circuit arrangement as claimed in claim 1, wherein the third duct extends in a substantially axial direction.

* * * * *